United States Patent Office 2,838,466
Patented June 10, 1958

2,838,466

SOIL STABILIZATION WITH POLYMERIZED MONOMERIC TRIAZINE AND PRODUCT

John J. Padbury, Springdale, and Russell L. Morgan, Riverside, Conn., assignors to American Cyanamid Company, New York, N. Y., a corporation of Maine No Drawing. Application June 11, 1953
Serial No. 361,078

13 Claims. (Cl. 260—29.6)

This invention relates to soil stabilization or agglutination and more particularly to imparting sufficient cohesion to soil so that it will support heavy loads.

For many years great difficulty has been experienced in the construction of roadways and air fields on certain types of soil especially the various clays which form very fluid, gummy muds and are, therefore, not capable of supporting heavy weights. Sandy soils are also generally unsuitable for supporting heavy loads by reason of their lack of cohesion. In order to overcome these difficulties, portable steel mats have been used and, of course, concrete and asphalt roadways and airport runways have been extensively employed for heavy vehicles and aircraft. These all have the common disadvantage of requiring the transportation of great quantities of heavy construction materials, sometimes for great distances and often where there are inadequate means for transportation. While a number of soil cements have been suggested for these purposes, there is a continuing demand for improved processes and materials.

It is an object of the invention to provide stabilized soils of sufficient hardness and toughness to support heavy weights such as motor vehicles, military equipment, aircraft and the like.

It is another object of the invention to prevent soil erosion.

A further object of the invention is to markedly increase the viscosity of fluid muds.

Still another object of the present invention is to solidify soil.

A still further object of the present invention is to impart hard or rubber-like properties to soils.

An additional object of the invention is to provide a process of stabilizing soil with a smaller amount of polymerizable material than employed heretofore.

Other objects and advantages of the invention will be apparent to those skilled in the art especially upon consideration of the detailed disclosure hereinbelow.

These and other benefits of the present invention are attained by incorporating in the soils, including sand, to be stabilized a water-soluble or water-emulsifiable polymerizable composition containing one or more of certain triazines and one or more of a different group of polymerizable unconjugated terminal ethenoid (i. e., compounds with a $CH_2=C<$ radical) monomers having a solubility of at least one percent by weight in water at 20° C., which composition is capable of being converted to a water-insoluble state while in association with soil.

These triazines are at least bifunctional and have the structural formula:

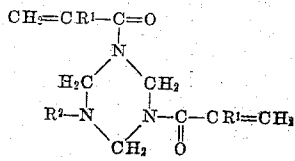

in which $R^1$ represents hydrogen or a methyl radical and $R^2$ stands for hydrogen or a

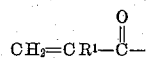

group. Such compounds are 1,3-di or 1,3,5-trisubstituted acrylyl (or methacrylyl) 1,3,5-hexahydrotriazines. Of these substances, 1,3,5-triacrylyl-1,3,5-hexahydrotriazine and 1,3,5 - trimethylacrylyl 1,3,5 - hexahydrotriazine are preferred for best results.

Any copolymerizable composition containing a hexahydrotriazine of the above formula and an unconjugated different monomer having a terminal ethylenic group, which composition is soluble or emulsifiable in water in the concentration used and is at the same time capable of being converted to a water-insoluble state by a polymerization process, either of the vinyl type (addition polymerization) or of a combination of condensation type and vinyl type, may be used in the novel process to produce the new stabilized soil compositions.

Among the suitable terminal ethenoid monomers, the acrylyl compounds are preferred. These include acrylic acid, acrylamide; N-alkylacrylamides wherein the alkyl group contains up to 4 carbon atoms such as N-ethylacrylamide, N-t-butylacrylamide, N-methylol acrylamide, acrylonitrile, saturated alkyl esters of acrylic acid (e. g., methyl acrylate, hydroxyethyl acrylate), monovalent and divalent salts of acrylic acid (e. g., calcium acrylate, sodium acrylate and ammonium acrylate as well as methyacrylic acid) and derivatives thereof corresponding to those listed hereinabove and the like. Other polymerizable unconjugated ethenoid monomers which, like those listed above, have the necessary solubility exceeding one percent in water at 20° C. may be used in connection with the present invention including the vinyl esters, certain substituted styrenes and various vinyl and allyl compounds such as vinyl acetate, vinyl pyridine, hydroxystyrene, monoallyl phthalate, methyl vinyl ketone, allyl alcohol and the like. As is evident from the example below, mixtures of two or more of such monomers may be employed as desired.

The comonomers described herein may be polymerized in soil without the addition of any catalyst if desired. However, uncatalyzed copolymerizations may require one or more weeks with certain reactants especially during cold weather. So the use of a polymerization catalyst is strongly recommended for most cases to expedite the polymerization reaction; usually a fast catalyst is selected to complete the polymerization in a relatively short period ranging from about 5 minutes to about 10 hours depending on the chosen catalyst and the temperature of the soil. Any of the usual addition polymerization catalysts may be employed provided that such agent is water-dispersible. The preferred catalysts are water-soluble oxygen-containing substances such as the ammonium, potassium and sodium persulfates, hydrogen peroxide, sodium, potassium and ammonium chlorates and the like. Redox catalyst systems consisting of an oxidizing compound and a reducing agent are also recommended; excellent examples of which are the chloric acid-sulfurous acid system described in application Serial No. 208,979, filed February 1, 1951, by Arthur Cresswell, now U. S. Patent No. 2,751,374 and the combination in water of potassium persulfate with sodium thiosulfate. The present process is not limited to any particular quantity of catalyst but between about 0.1 and about 10 percent based on the weight of polymerizable matter may be used in general.

When a methylol compound is present in the comonomers, it is desirable in some applications that the polymerization medium be either strongly alkaline or strongly acidic in order that the methylol radicals will polymerize by a condensation reaction. Thus, the reaction may be conducted at a pH either below 5 or above 9 in this instance and the reaction rate may be increased by either lowering the pH below 4 or raising it above 10. Such adjustment of the reaction conditions is optional since any methylol compound present will also contain a terminal ethylenic group which lends itself to addition polymerization.

Certain redox systems (e. g., chloric acid-bisulfite) require acid conditions and others operate best under acid conditions. If acid polymerization is contemplated, any desired acidic material including sulfuric acid, hydrochloric acid, phosphoric acid, diammonium hydrogen phosphate, ammonium chloride, ammonium sulfate, etc. may be used for this purpose. In some cases, it may be desirable to use organic acids but since they are more expensive, this is generally not an economical procedure. However, acetic acid, oxalic acid, tartaric acid, phthalic anhydride and other acids may be used.

In some cases, it may be more desirable to polymerize under alkaline conditions. For such purposes any water-soluble alkali may be used but in general, sodium carbonate, potassium carbonate, sodium hydroxide, ammonium hydroxide, potassium hydroxide and calcium hydroxide are preferred because they are relatively inexpensive as compared to other alkaline materials. Organic bases such as guanidine carbonate, however, may be used.

In the case of alkaline soils it is possible to use a catalyst system comprising an amine as the activator for the vinyl polymerization. Examples of activators for peroxy type catalysts such as persulfates are polyamines. i. e., diethylene triamine, tetraethylene pentamine, etc., triethanolamine, dimethylamino-propionitrile, dimethylamino-acetonitrile, etc.

The gel formation of a particular resin may vary depending upon whether polymerization is effected in the presence of acid or alkali, and this factor should also be considered in determining the polymerization conditions.

The present invention is applicable to all types of clays and sands and various other soils containing mixtures thereof, which are normally soft or muddy, and which would ordinarily not be satisfactory for use by heavy vehicles.

Where any of the comonomers, catalysts or activators mentioned above is insoluble or only very slightly soluble in water, an emulsifying agent may be used to insure compatibility with water and, therefore, intimate contact with the other substances present. Increased penetration of the emulsion into soil is also obtained. The conventional emulsifiers may be employed and, of course, the selection of the particular dispersing agent should be predicated upon the pH of the polymerization reaction in order to obtain the maximum solubilizing effect with any given agent since certain agents function best in alkaline media and others in acidic solutions. Any of the well-known agents may be employed including the alkali metal salts of sulfosuccinates or of alkyl aryl sulfonates or of the sulfated higher fatty alcohols; as examples, inter alia, diamyl, dihexyl or dioctyl sulfo-succinic esters and salts thereof, sodium alkyl naphthalene sulfonic acid, sodium lauryl sulfate, triethanolamine stearate, sodium palmitate and other alkali metal soaps and equivalent emulsifiers. Conventional quantities of such agents are recommended; for instance, from 1 to 5 percent by weight of the difficultly soluble material.

Between about 0.5 and about 35.0 parts by weight of the triazine should be copolymerized with each 100 parts of the terminal ethenoid monomer and it is preferred to use between 0.8 and 15.0 parts of the substituted hexahydrotriazine on the same basis. The ratio of soil to polymerizable material may be varied greatly depending on the particular purpose of the treatment. At least 3 parts of soil should be impregnated with each part by weight of polymerizable matter. However, the upper limit is not as easy to specify. Relatively impermeable linings for irrigation canals may be formed from mixtures of 150 and possible even more parts of soil per part of comonomers. For most purposes, not more than 25 parts of soil should be used and the best results for load bearing applications are generally obtained when the soil actually being impregnated or mixed ranges between 3 and 15 parts per part of polymerizable material.

Ordinarily, the polymerizable material is dissolved or dispersed in water to form a solution or dispersion which is mixed with the soil. However, it is also contemplated that the dry mixture of monomers may be mixed in powdered form into soil without the addition of water. Water is, of course, necessary in order that the material may polymerize. In cases where mud or wet sand is being treated, the water content of the soil may already be sufficient for polymerization to a stabilized soil. In still other instances, the polymerizable material may be mixed onto the soil while dry and rainfall relied upon to supply the necessary water. The concentration of the solution or dispersion and the quantity used may be regulated so that the concentration of water in the final mixture of soil and stabilizing additive varies anywhere between about 5 percent and about 65 percent by weight, depending primarily on the type of soil. Sand, for example, requires much less water than certain of the clays. The proportion of water used determines to some extent the properties of the resulting stabilized soil.

The mixture of monomers described herein polymerizes to form a cross-linked polymer which is, of course, infusible and insoluble. The substituted hexahydrotriazines serve as cross-linking agents for the terminal ethenoid monomers, so these triazines must be at least bifunctional, that is, contain at least two groups which are capable of linking to another molecule in a polymerization reaction; trifunctional triazines being preferred. In the polymerization reaction, it is believed that the triazines described above copolymerize with other terminal ethenoid monomers to form molecules containing recurring units derived from the triazine monomer having the following structural formula:

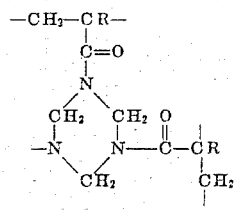

in which R is hydrogen or a methyl group.

For a fuller understanding of the nature and objects of the invention, reference should be had to the following illustrative examples, in which the proportions are given in parts by weight. It is not intended that the invention be limited in scope to the details therein set forth.

*Examples*

Concentrated aqueous solutions containing about 35 to 45 percent of various monomeric acrylic acid derivatives, alone or in combination, are mixed with small amounts of the above-mentioned substituted hexahydrotriazines. A suitable catalyst is added and the catalyzed compositions are mixed with the stated quantity of air dry soil in beakers with a stirring rod and permitted to copolymerize at about 20° to 30° C. in situ without any tamping or other compression. When methylolacrylamide is used, acid or alkali is added to the aqueous solution thereof to adjust its pH to about 4 or 11, in order to expedite the condensation of the methylol groups. The observed results are tabulated below:

| | Composition, weight percent | | | | | | | | | | | | Product characteristics | | |
|---|---|---|---|---|---|---|---|---|---|---|---|---|---|---|---|
| | Resin Monomers | | | | Catalyst | | | Soil | | | | | | | |
| Ex. | Calcium acrylate | Methylol acrylamide | Triacrylyl hexahydrotriazine | Trimethacrylyl hexahydrotriazine | $K_2S_2O_8$ | $NaHSO_3$ | HCl or NaOH | Kaolinite | Bentonite | Sand | Water | After aging 16 hours at 25° to 30° C. | After overnight immersion of aged product in water. | Remarks |
| I | 16.25 | | 0.20 | | 0.15 | 0.05 | | | | 50.00 | 33.35 | Strong flexible solid | No change | 1.2% cross-linking agent on weight of the calcium acrylate. |
| II | 18.75 | | 0.23 | | 0.17 | 0.06 | | | | 57.73 | 23.06 | Tough flexible product | do | Reduced water content increased strength over Example I. |
| III | 16.25 | | 0.20 | | 0.15 | 0.05 | | 50.00 | | | 33.35 | Non-uniform generally hard and tough with some soft zones. | Soft portions disintegrated. | Inadequate mixing—more water would aid mixing. |
| IV | 16.25 | | 0.20 | | 0.15 | 0.05 | | | 50.00 | | 33.35 | Tough slightly flexible solid. | No change | |
| V | 16.25 | | | 0.20 | 0.15 | 0.05 | | | 50.00 | | 33.35 | Tough solid | do | |
| VI | 16.20 | | 0.40 | | 0.15 | 0.05 | | | 50.00 | | 33.20 | Tough very slightly flexible solid.[1] | Became somewhat more flexible. | 2.5% cross-linking agent on weight of the calcium acrylate. |
| VII | 16.25 | | 1.65 | | 0.15 | 0.05 | | | 50.00 | | 31.90 | Very hard solid | No change | 10% cross-linking agent, product much harder but not as tough as Ex. IV. |
| VIII | 6.60 | 4.65 | 0.10 | | 0.10 | 0.02 | [2]0.01 | | | 67.50 | 21.02 | Hard solid | do | 0.9% cross-linking agent on weight of other resin monomers. |
| IX | 5.28 | 3.72 | 0.08 | | 0.08 | 0.02 | [2]0.01 | 54.00 | | | 36.81 | Stiff rubbery mass somewhat softer on the surface. | do | Non-uniform due to inadequate mixing. |
| X | 4.02 | 2.85 | 0.13 | | 0.07 | 0.02 | [2]0.06 | 50.00 | | | 42.85 | Tough very slightly flexible solid.[1] | Somewhat more flexible. | 2% cross-linking agent on weight of other resin monomers. |
| XI | 5.68 | 4.03 | 0.20 | | 0.10 | 0.03 | [3]0.07 | 67.50 | | | 22.39 | Tough slightly flexible solid.[1] | Became slightly more flexible. | |
| XII | | [4]19.0 | 1.00 | | 0.75 | 0.25 | | | | 50.00 | 29.00 | Tough, flexible product. | No change | 5% cross-linking agent. |

[1] Aged 5 days.
[2] HCl.
[3] NaOH.
[4] Unsubstituted acrylamide.

In comparison with soil stabilized with calcium acrylate alone, it is observed that the products of the above specific examples exhibit a decrease in water sensitivity or swelling. In addition, a smaller quantity of the polymerizable mixtures disclosed herein may be used than in the case of the soil treated only with calcium acrylate. It will be noted that some of the above stabilized soils are described as rubbery or flexible whereas others are harder and more rigid. A certain selectivity is possible in the treatment, for with any given soil a product of a more flexible nature may be obtained by decreasing the ratio of triazine monomer to terminal ethenoid monomer whereas a harder product may be obtained by increasing this ratio.

The polymerizable material may be incorporated with the soil in any desired manner as, for example, by mixing in a revolving drum. A satisfactory method comprises pre-mixing the soil and monomer and adding to the mixture a solution of the catalyst in water. Another method of application which may sometimes be employed is spraying an aqueous solution or dispersion of the polymerizable material onto the ground which it is desired to toughen. This expedient may not result in sufficient penetration for some purposes, however, but this difficulty can often be at least partially overcome by plowing the soil either before or after spraying or simultaneously therewith. A sufficient amount of dispersion to impregnate the soil to a depth of at least 1.5 inches should be employed. Plowing of the soil can conveniently be done with the "rotor tiller" type of plow having revolving tines which thoroughly mix the top few inches of soil. For maximum stabilization of the soil, the treated earth should be compacted by rolling or tamping to bring the soil particles close together so that they may be cohered by the polymerization of the agent.

In order to ensure sufficient strengthening of any given section of ground for the support of heavy weight, a surface layer of from about 1.5 to 6 inches of soil treated according to the process of the present invention should be provided. The actual depth necessary will vary depending upon how fluid the soil is to begin with or, in other words, how much solidifying is required. It is also contemplated that for certain purposes the surface soil, that is, the soil adjacent and within the surface of earth, may be impregnated according to the process of the present invention up to a depth of 12 inches but such treatments are increasingly more expensive than those recommended. So far as can be determined, the treatment of the soil is quite durable and apparently permanent where the soil is not overloaded or broken up.

As used in the present specification and claims, the term "stabilized" applied to soil means to impart to the soil high viscosity, solid or rubber-like properties. In addition to a wide variety of uses for highways, foot paths, bridle paths, camp sites, storage yards, linings for irrigation ditches and the like, the present process offers considerable promise as a method for cementing oil well casings. The prevention of "lost circulation" during drilling is also obtainable by the use of aqueous slurries of clay and the present comonomers either with or without expanded mica, known as "Perlite," or vermiculite. While most applications involve the treatment of surface soils, it is also contemplated that a solution may be injected into the ground under pressure by means of a pipe of suitable length for certain uses such as stabilizing foundations to obviate the use of pilings, to prevent the washing out of levees and river banks, etc.

It is also contemplated that the present invention may be useful in soil conditioning or the binding of soil particles into aggregates ranging in size from a fraction of a millimeter to about a centimeter. In this employment the soil is sprayed with a solution or dispersion of the polymerizable material in the usual manner in a light application. The quantities of monomers employed are those conventional for soil conditioning and, hence, usually less than for stabilizing soil. Wherever a crust is formed on the surface, the crust should be broken up by suitable equipment which will not turn under the broken crust. Burying the crust is undesirable since the aggregated soil should remain on the surface in soil conditioning treatments.

Since certain changes in carrying out the above process and certain modifications in the composition which embody the invention may be made without departing from its scope, it is intended that all matter contained in the above description shall be interpreted as illustrative and not in a limiting sense.

We claim:

1. A composition of matter which comprises soil and the substantially water-insoluble product of the polymerization of a monomeric triazine having the formula:

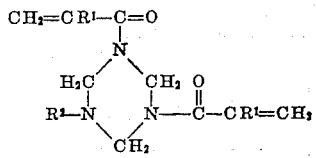

in which $R^1$ is of the group consisting of hydrogen and methyl radicals and $R^2$ is of the group consisting of hydrogen and

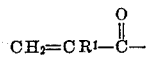

radicals in admixture with a different polymerizable unconjugated terminal ethenoid monomer having a solubility of at least 1 per cent by weight in water at 20 degrees centigrade.

2. A composition according to claim 1 in which said ethenoid monomer is an acrylyl compound.

3. A composition according to claim 1 in which said ethenoid monomer is calcium acrylate.

4. A composition according to claim 1 in which said ethenoid monomer is methylolacrylamide.

5. A composition according to claim 1 in which said ethenoid monomer is acrylamide.

6. A composition according to claim 1 in which said triazine is 1,3,5-triacrylyl 1,3,5-hexahydrotriazine.

7. A composition according to claim 1 in which the monomer mixture comprises 100 parts by weight of said ethenoid monomer and between about 0.5 and about 35.0 parts of said triazine.

8. A composition which comprises soil and the substantially water-insoluble product of the copolymerization of a mixture of between 0.8 and 15.0 parts by weight of 1,3,5-triacrylyl 1,3,5-hexahydrotriazine and 100 parts of another unconjugated acrylyl compound having a solubility of at least 1 percent by weight in water at 20 degrees centigrade.

9. A composition which comprises soil and an aqueous dispersion of a material convertible by polymerization to a water-insoluble state and comprising a monomeric triazine having the formula:

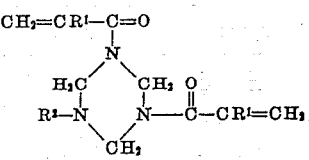

in which $R'$ is of the group consisting of hydrogen and methyl radicals and $R^2$ is of the group consisting of hydrogen and

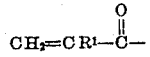

radical in admixture with a different polymerizable unconjugated terminal ethenoid monomer having a solubility of at least 1 percent by weight in water at 20 degrees centigrade.

10. A process which comprises incorporating into soil in sufficient quantity to increase the cohesion of soil particles, a polymerizable mixture of a monomeric triazine having the formula:

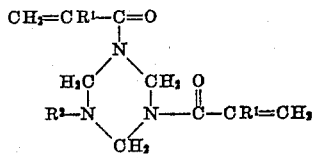

in which $R'$ is of the group consisting of hydrogen and methyl radicals and $R^2$ is of the group consisting of hydrogen and

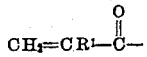

radical in admixture with a different polymerizable unconjugated terminal ethenoid monomer having a solubility of at least 1 percent by weight in water at 20 degrees centigrade.

11. A process according to claim 10 which comprises impregnating at least about 3 parts of soil with an aqueous dispersion of 1 part by weight of said polymerizable mixture.

12. A process according to claim 11 in which the soil is impregnated by spraying the ground with a sufficient amount of the dispersion to impregnate the soil to a depth of at least 1.5 inches with said quantity of the dispersion.

13. A process which comprises removing soil from the ground, mixing to a consistency in which the water content does not exceed 65 percent of the total weight an addition polymerization catalyst operable at atmospheric temperatures with at least 3 pounds of said soil and an aqueous dispersion of 1 pound of a mixture of between 0.8 and 15.0 parts by weight of 1,3,5-triacrylyl 1,3,5-hexahydrotriazine and 100 parts of another unconjugated acrylyl compound having a solubility of at least 1 percent by weight in water at 20 degrees centigrade, distributing a layer at least 1.5 inches thick of the impregnated soil on the ground, compacting the impregnated soil and polymerizing said mixture to a water-insoluble state.

References Cited in the file of this patent

UNITED STATES PATENTS 2,651,619  De Mello et al. _____ Sept. 8, 1953